US011538001B2

(12) United States Patent
Handoko et al.

(10) Patent No.: US 11,538,001 B2
(45) Date of Patent: Dec. 27, 2022

(54) SYSTEMS AND METHODS FOR CRYPTOCURRENCY TRANSACTIONS IN AIRCRAFT

(71) Applicant: Systems and Software Enterprises, LLC, Brea, CA (US)

(72) Inventors: Andri Handoko, Brea, CA (US); Steven Hawkins, Brea, CA (US); Samuel A. Carswell, Brea, CA (US)

(73) Assignee: Safran Passenger Innovations, LLC, Brea, CA (US)

(*) Notice: Subject to any disclaimer, the term of this patent is extended or adjusted under 35 U.S.C. 154(b) by 399 days.

(21) Appl. No.: 15/944,291

(22) Filed: Apr. 3, 2018

(65) Prior Publication Data

US 2018/0293555 A1 Oct. 11, 2018

Related U.S. Application Data

(60) Provisional application No. 62/480,715, filed on Apr. 3, 2017.

(51) Int. Cl.
| | | |
|---|---|---|
| *G06Q 20/06* | (2012.01) | |
| *G06Q 20/38* | (2012.01) | |
| *G06Q 20/36* | (2012.01) | |
| *G06Q 20/40* | (2012.01) | |

(52) U.S. Cl.
CPC ........... *G06Q 20/065* (2013.01); *G06Q 20/36* (2013.01); *G06Q 20/3829* (2013.01); *G06Q 20/401* (2013.01); *G06Q 2220/00* (2013.01)

(58) Field of Classification Search
CPC ............. G06Q 20/102; G06Q 20/4014; G06Q 20/023; G06Q 20/085; G06Q 20/389; G06Q 20/405; H04L 67/1042; H04L 9/0637; H04L 9/3239; H04L 2209/805; H04L 2209/38; H04W 12/06; H04W 4/38
See application file for complete search history.

(56) References Cited

U.S. PATENT DOCUMENTS

| | | | | |
|---|---|---|---|---|
| 2013/0232038 A1* | 9/2013 | Murray | ................... | G06F 21/10 705/27.1 |
| 2014/0040139 A1* | 2/2014 | Brudnicki | ......... | H04W 12/0471 705/44 |
| 2014/0214466 A1* | 7/2014 | Francis | ................ | G06Q 30/016 705/304 |
| 2015/0358052 A1* | 12/2015 | Muirhead | .......... | H04B 7/18506 455/41.1 |

(Continued)

FOREIGN PATENT DOCUMENTS

WO   WO2016202952 A1   12/2016

*Primary Examiner* — Steven S Kim
*Assistant Examiner* — Vincent I Idiake
(74) *Attorney, Agent, or Firm* — Umberg Zipser LLP; Ryan Dean

(57) ABSTRACT

Transaction systems and methods are described for verifying transactions in a vehicle. The transactions utilize blockchains of a cryptocurrency to allow for verification of a transaction even where a live Internet connection is unavailable. The systems and methods utilize a digital wallet stored in the vehicle that allows for transactions with a passenger having a passenger digital wallet. A plurality of local nodes disposed in the vehicle store a local and updated copy of the blockchain to allow for verification of the cryptocurrency transactions even during periods of intermittent internet connectivity.

3 Claims, 2 Drawing Sheets

(56) References Cited

U.S. PATENT DOCUMENTS

| | | | |
|---|---|---|---|
| 2016/0086175 A1* | 3/2016 | Finlow-Bates | H04W 12/068 |
| | | | 705/77 |
| 2016/0180338 A1 | 6/2016 | Androulaki et al. | |
| 2017/0041148 A1 | 2/2017 | Pearce | |
| 2018/0025442 A1* | 1/2018 | Isaacson | G06F 3/048 |
| | | | 705/26.62 |
| 2018/0248685 A1* | 8/2018 | O'Brien | H04L 9/3297 |
| 2018/0276666 A1* | 9/2018 | Haldenby | G06Q 20/20 |
| 2019/0356641 A1* | 11/2019 | Isaacson | G06Q 20/384 |

* cited by examiner

SYSTEMS AND METHODS FOR CRYPTOCURRENCY TRANSACTIONS IN AIRCRAFT

This application claims priority to U.S. provisional application having Ser. No. 62/480,715 filed on Apr. 3, 2017. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is in-vehicle transaction systems, and, in particular, cryptocurrency transactions for use in passenger aircraft or other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In present day commercial transaction systems, such as those used in passenger aircraft, realtime confirmation of a payment transaction to a centralized server is typically needed, which usually requires constant and live Internet connectivity, especially for larger monetary amounts.

In addition, as airlines and other services move more and more to an on-demand usage model for food and entertainment, it can be useful to enable passengers to make payments at their seat without requiring a flight attendant to bring a credit card reader to the passenger when the transaction is desired.

One alternative is to build-in a credit card or NFC reader in each seat display unit (SDU) for passenger use; however, such components are an added expense and increase the space and weight requirements of the SDU.

Where passengers would like to purchase expensive items, such as through an on-board catalog or duty-free merchandise, for example, this generally requires an Internet connection to allow the transaction processor to connect with a bank to determine whether sufficient funds exist for the transaction.

Thus, there is still a need for in-vehicle transaction systems and methods that allow for offline transactions to take place while ensuring the availability of funds and necessary security to prevent misuse.

SUMMARY OF THE INVENTION

The inventive subject matter describes systems and methods for passengers to make secure and verifiable transactions aboard aircraft or other passenger vehicles using digital cryptocurrency and payments using blockchain, especially those vehicles that experience long-delayed connectivity or an intermittent network. Although the below discussion focuses on an aircraft, it is contemplated that the systems and methods discussed herein could likewise be used on ships, trains, busses, and other vehicles.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
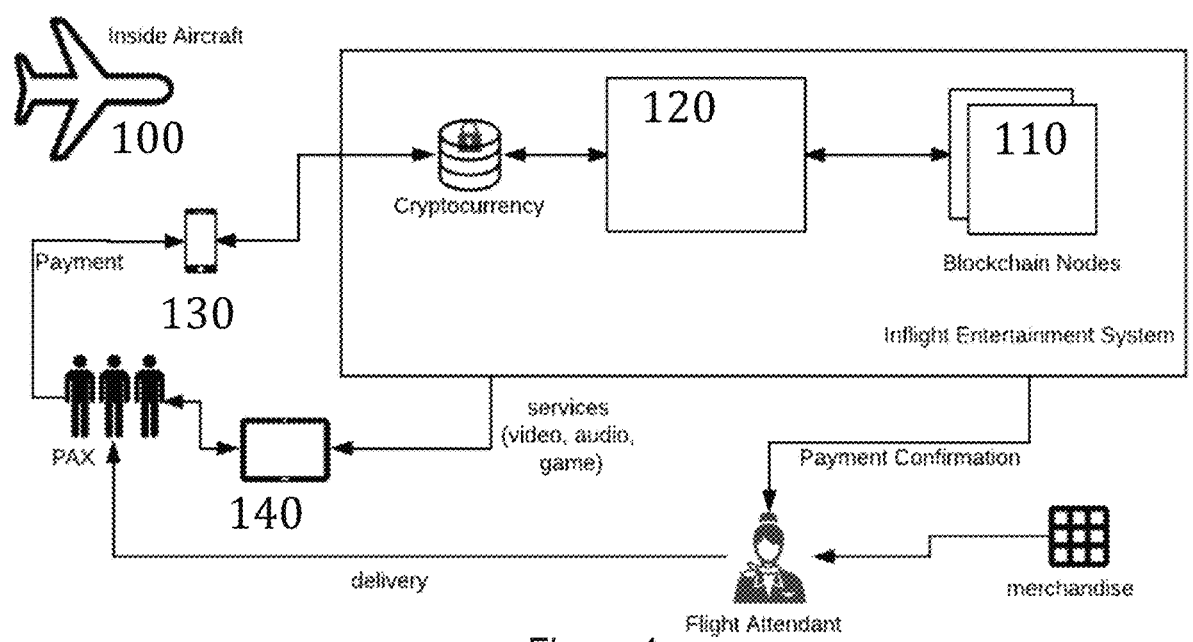
FIG. 1 illustrates one embodiment of a payment system for an in-vehicle transaction system using cryptocurrency.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The systems and methods described herein present numerous advantages over traditional payment systems including, for example, (1) elimination of the need for immediate Internet access to receive and validate transactions, (2) providing the ability to airlines and other companies to electronically issue "reward" coins or currency onboard and outside of the vehicle that could be used by passengers during transit or on the ground, (3) no bank fees or requirements for PCI compliance, (4) no exchange fees, and (5) small transaction' fees when compared with typical bank charges.

One should appreciate that the disclosed techniques provide many advantageous technical effects including eliminating the need for airlines, cruise lines, and other companies specializing in passenger travel to invest in the reoccurring high expenses required to support live connectivity in an aircraft or other vehicle, and allow for trusted cryptocurrency transactions in aircraft or other vehicles using blockchain technology even with long scheduled/unscheduled delay or intermittent connectivity to the Internet.

Cryptocurrencies such at Bitcoin are preferred because their digital ledger system using blockchains provides for a virtually incorruptible digital ledger of economic transactions. Although a number of different cryptocurrencies exist, Bitcoin™ is presently the largest cryptocurrency in terms of total market value, and is the most known and discussed application of the blockchain. Thus, for purposes of the discussion below, Bitcoin will be used as an example. However, other cryptocurrencies could also be used. A discussion concerning one form of cryptocurrency is found in WIPO publication no. 2016/202952 to Tewari, et al. published on Dec. 22, 2016, which is incorporated herein by reference.

In general, to use make a transaction using a cryptocurrency, a wallet is required by both parties to the transaction. As used herein, the term "wallet" means a software application likely residing on a passenger's smart phone or other device that allows the passenger to store and exchange cryptocurrencies (e.g., Bitcoins) that is protected by cryptographic algorithm(s) and uses a unique pair of private and public keys. The wallet can be stored on a passenger's smart phone, tablet PC, watch, laptop, or other portable computing device, for example. When a transaction is entered, the transaction is broadcast to all nodes, which each contains a copy of the blockchain or ledger of previous transactions. This helps to ensure that digital currency is not spent twice, and along with the user specific key, ensures the transaction is legitimate and that the user is actually the owner of the currency.

Bitcoin™ uses a blockchain that begins with a genesis block, and is followed by subsequent transaction blocks, which typically each represent all transactions received in a 10 minute period. Each transaction block refers to the previous transaction block and thereby builds on the previous blocks forming the blockchain. This helps prevent fraud by inhibiting modification of a block because such modification would also require modification of all following blocks, all within less than 10 minutes when a new transaction block is added.

As shown in FIG. 1, the systems and methods contemplated herein preferably comprise one or more local nodes 110 disposed on the aircraft 100 or other vehicle to handle the cryptocurrency transactions. Preferably, the local nodes 110 are blockchain nodes, and store a copy of the latest version of the blockchain of the cryptocurrency 115 from a node disposed away from the vehicle and as of the time of departure or prior to losing Internet connectivity. In this manner, the local nodes 110 on the vehicle should have the most up-to-date information concerning any transactions by the passengers prior to the flight departing, thereby providing additional certainty that the passengers' wallets have the necessary amount of currency to complete a transaction. If no Internet access is available and an updated version of the blockchain of the cryptocurrency cannot be obtained from a node outside of the aircraft, then it is also unlikely that one or more passengers have made a transaction off of the aircraft.

Advantageously, only a minimal structure of distributed local nodes 110 is required to share transactions. Contemplated systems and methods rely on a "best effort" basis to broadcast transaction messages, and nodes can leave and rejoin the network at will. Preferably, the wallet 130 of the airline can be part of the in-flight entertainment system 140, and communicate with the passenger's device storing the passenger's wallet via a wired or wireless connection.

As discussed further below, contemplated transactions include, for example, merchandise purchase, movie or other entertainment purchases, and food or beverage purchases.

A transaction can be received by the transaction system 120, which attempts to verify the transaction via one or more local nodes 110 on the aircraft 100 or other vehicle. It is contemplated, but not necessary, that the transaction system 120 could look to nodes off of the aircraft 100 such as where Internet access is available.

Because the local node(s) 110 presumably have an up-to-date copy of the blockchain as of the point of departure of lost connectivity, and the passenger would also have lost Internet connectivity, the secure payment transaction between a passenger (buyer) and the airline (seller), for example, can be handled without live Internet connectivity, and can instead be validated using the local blockchain nodes present on the aircraft 100.

Figure 2:
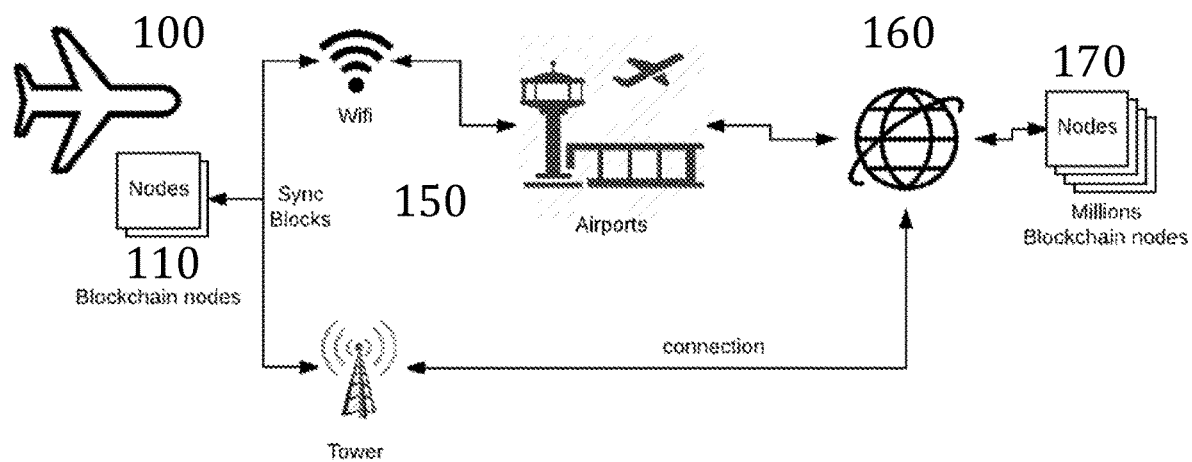
FIG. 2 illustrates one embodiment of how the payment system connects to the Internet to update transactions with other distributed nodes.

As shown in FIGS. 1-2, the in-flight entertainment system 140 would include the electronic wallet 130 and then transfer the money collected to a ground server 150 either immediately depending on Internet connectivity or after the aircraft lands. At this point, the aircraft's servers coins can be emptied or filled based on the transactions recorded while in flight. It is contemplated that the connection to the ground server can be physical, wired or wireless.

The secure payment transaction in the aircraft will be handled just within the local node(s) 110 during the isolation. Eventually the entire network would be reunified upon reconnection to the Internet 160 where the new data blocks are collected from other distributed nodes 170 and verified by the aircraft nodes to complete its Blockchain local copy. An example of this is shown in FIG. 2.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An in-flight transaction system, comprising:
    a plurality of local servers disposed within an aircraft, wherein each of the plurality of local servers comprises at least one processor and a memory, wherein each of the plurality of local servers execute software instructions stored on the memory, and wherein each of the plurality of local servers stores a copy of a blockchain of a cryptocurrency in the memory, wherein the blockchain comprises a digital ledger of previous transactions including a balance of funds available for one or more passengers on the aircraft, and wherein the stored copy of the blockchain is a copy of a blockchain of the cryptocurrency retrieved prior to departure of the aircraft and prior to a loss of live Internet connectivity from a ground-based network; and
    a transaction server disposed within the aircraft and having a processor, wherein the transaction server is communicatively coupled to each of the plurality of local servers via a local intranet of the aircraft, and wherein the transaction server;
        (i) receives a transaction that uses the cryptocurrency from a device of one of the passengers,
        (ii) accesses the previous transactions of the digital ledger of the stored copy of the blockchain and compares information of the transaction with the previous transactions of the digital ledger of the stored copy of the blockchain using the processor to determine whether the balance of funds for the passenger associated with the transaction is sufficient to complete the transaction during the loss of live Internet connectivity and verify the transaction, wherein the transaction server verifies the transaction locally (a) by comparing information of the transaction with the digital ledger of the stored copy of the blockchain stored in the memory of the one or more of the plurality of local servers and (b) without live Internet connectivity from the ground-based network,
        (iii) if the transaction is verified, the transaction server appends the transaction to the stored copy of the blockchain to generate a new blockchain ledger and broadcasts the new blockchain ledger to each of the plurality of local servers of the aircraft;
        (iv) transmits the new blockchain ledger with the appended transaction to a ground-based server outside of the aircraft upon reconnection to the Internet and
        (v) upon reconnection to the Internet receives an updated blockchain ledger comprising new data blocks from nodes disposed outside of the aircraft.

2. The system of claim 1, further comprising a digital wallet stored in a memory of and executed by one of the plurality of local servers, wherein the digital wallet stores the balance of funds of the cryptocurrency for a passenger and exchanges the cryptocurrency, and wherein the one of the plurality of local servers encrypts the cryptocurrency using a unique pair of private and public keys.

3. The system of claim 1, wherein the transaction comprises at least one of a merchandise purchase, a movie purchase, and a food or beverage purchase.

* * * * *